United States Patent [19]

Cantrill et al.

[11] Patent Number: 5,514,750
[45] Date of Patent: May 7, 1996

[54] PARTICULATION OF A METASTABLE SYRUP

[75] Inventors: James E. Cantrill, Acton; Thomas R. Doyle, Leominster, both of Mass.

[73] Assignee: Novacor Chemicals (International) S.A., Fribourg, Switzerland

[21] Appl. No.: 424,595

[22] Filed: Apr. 17, 1995

Related U.S. Application Data

[63] Continuation of Ser. No. 93,277, Jul. 19, 1993, abandoned.

[51] Int. Cl.$^6$ .................................................. C08F 279/02
[52] U.S. Cl. ................................. 525/52; 525/53; 525/198; 525/316; 528/502C
[58] Field of Search ........................... 525/52, 53, 198, 525/316; 528/502

[56] References Cited

U.S. PATENT DOCUMENTS

| | | | |
|---|---|---|---|
| 2,694,692 | 11/1954 | Amos et al. | 260/45.5 |
| 3,658,946 | 4/1972 | Bronstert et al. | 260/878 R |
| 3,660,535 | 5/1972 | Finch et al. | 260/880 |
| 3,883,616 | 5/1975 | Hozumi et al. | |
| 3,903,202 | 9/1975 | Carter et al. | 260/880 R |
| 4,007,234 | 2/1977 | Schuddemage et al. | 260/878 R |
| 4,233,418 | 11/1980 | Lingier et al. | |
| 4,308,354 | 12/1981 | Jung et al. | |
| 4,857,587 | 8/1989 | Sosa et al. | 525/53 |
| 4,861,827 | 8/1989 | Sosa et al. | 525/54 |
| 4,985,208 | 1/1991 | Sugawara et al. | |
| 5,210,132 | 5/1993 | Matsubara et al. | 525/53 |
| 5,274,029 | 12/1993 | Kelley | |
| 5,278,253 | 1/1994 | Baumgartner et al. | |
| 5,340,891 | 8/1994 | Imamura et al. | 526/88 |

FOREIGN PATENT DOCUMENTS 832523  1/1970  Canada.

OTHER PUBLICATIONS

Kirk–Othmer, *Encyclopedia of Chemical Technology*, 1983, vol. 21, pp. 823–826.

*Primary Examiner*—Vasu S. Jagannathan
*Attorney, Agent, or Firm*—Bruce E. Harang

[57] ABSTRACT

A post inversion metastable syrup comprising a continuous or co-continuous rubber like composite phase and a discontinuous or co-continuous resin phase may be particulated by the application of a shear field to yield a stable syrup comprising a dispersed rubber-like composite phase and a continuous resin phase. The application of a uniform shear field to the post inversion metastable syrup is particularly desirable since it results in a high degree of control over the size and distribution of the dispersed rubber-like composite phase. As a result it is possible to optimize the particle size distribution in an impact modified thermoplastic and obtain better or a better balance of properties. The present invention also provides in cooperating arrangement reactors or devices to produce a post inversion metastable syrup, a device to subject the roetastable syrup to a shear field and a polymerization plant.

18 Claims, 5 Drawing Sheets

PARTICULATION OF A METASTABLE SYRUP

This is a continuation of application(s) Ser. No. 08/093,277, filed on Jul. 19, 1993, now abandoned.

FIELD OF THE INVENTION

The present invention relates to a process to improve the properties or balance of properties of impact modified thermoplastics. More particularly, the present invention relates to a process that produces a post inversion metastable continuous or co-continuous rubber-like composite phase in a syrup comprising a dispersed or co-continuous resin phase and later in the process particulates it to a stable dispersed rubber-like composite phase in a syrup comprising a continuous resin phase.

BACKGROUND OF THE INVENTION

The field of the manufacture of impact modified plastics is relatively old and the current industrial processes for their manufacture are fairly well known. According to conventional technology typically a solution of rubber, typically comprising 1 to about 20, preferably from 3 to 12 weight %, most preferably 4 to 10 weight % of rubber dissolved in one or more monomers is polymerized in a first stage reactor under mechanical agitation. Whether the polymerization occurs in a batch, stirred plug flow or continuous stirred tank reactors, almost all prior art and disclosures clearly teach that the particle size, particle size distribution and morphology of the dispersed rubber-like composite phase of the final product is largely determined during particulation in the early part of the process.

Particulation is the generic term used to describe the formation of the dispersed rubber-like composite phase regardless of its mechanism.

In the production of high impact polystyrene in a batch process or in a stirred plug flow reactor, the rubber-like composite phase is the continuous phase and the resin phase (monomer/resulting polymer phase) is dispersed. Typically, in conventional processes, as the polymerization proceeds in time with a batch reactor or in space with a stirred plug flow reactor, at some point between 5 and 20% conversion the system undergoes particulation by phase inversion under the application of a shear field generated by mechanical agitation. That is the rubber-like composite phase becomes the dispersed phase and the resin phase becomes the continuous phase. This does not happen instantaneously but occurs over a considerable period of time or space, typically from 20 to 50 minutes or reactor space which produces 2 to 8% conversion. That is the rubber-like composite phase and resin phase become co-continuous for a period of time or space before the particulation process is complete.

The ternary phase diagram of the styrene-polystyrene-polybutadiene system has been well studied and is well known. For example, the phase diagram and what happens during the polymerization of high impact polystyrene is discussed in Kirk-Othmer Encyclopedia of Chemical Technology published in 1983, Volume 21, pages 823 through 826.

In the production of high impact polystyrene in a continuous stirred tank reactor (CSTR) the rubber phase is particulated by the mechanism of dispersion. That is the rubber or rubber-like composite phase is dispersed in a CSTR that is operated with a continuous resin phase.

The distinction between rubber phase and rubber-like composite phase used in this document is as follows: The rubber phase is simply rubber dissolved in one or more monomers, while the rubber-like composite phase refers to rubber that has been modified by reaction with one or more monomers during polymerization. That is during polymerization polymer chains containing one or more monomers is grafted to the rubber molecules. In addition to graft copolymer, the rubber-like composite phase may contain occluded polymer. Occluded polymer is not grafted to the rubber molecules and resides within the rubber-like composite phase.

According to conventional wisdom the polymer chemist has a limited degree of freedom concerning the process of particulation in the manufacture of impact modified thermoplastic resins. That is particulation is limited to the region of phase inversion in a batch process and stirred plug flow reactors or at the point of dispersion in CSTR's. It is impossible to precisely control particulation in batch or plug flow reactors since it occurs over a period of time or a region of reactor space. In a CSTR particulation by dispersion occurs almost instantaneously, but due to the dynamics of the system the time the particles spend in the reactor is described by an exponential distribution. That is some particles exit the reactor shortly after forming while others may reside much longer. Furthermore, in a CSTR it is difficult, if not impossible to ensure that each unit volume of the reactants under goes the same or comparable shear history. As a result the particle size distribution of the dispersed rubber-like composite phase is typically broadest when formed in a CSTR.

Particle size, particle size distribution and morphology contribute to a number of properties of the product including impact resistance, gloss and translucency. Unfortunately, generally to maximize one property tends to reduce one or more of the other properties of the final polymer. There have been some attempts to overcome these deficiencies by blending resins having different particle sizes. Such an approach is expensive as it requires passing a melt blend of the resins through an extruder. Additionally, the properties of a blend may be lower than that expected from the weighted numerical average of the properties of each of the components in the blend.

The following is representative of the state of the art in the polymerization of impact modified thermoplastics and of the requirement for mechanical agitation or shear during the early stages of the reaction and particularly prior to and during phase inversion. Almost all techniques largely determine the final particle size of the rubber-like composite phase at the point of phase inversion or dispersion.

U.S. Pat. No. 2,694,692, issued Nov. 16, 1954, assigned to The Dow Chemical Company discloses the desirability and criticality of agitation during the early stages of polymerization of impact modified thermoplastic polymers.

U.S. Pat. No. 3,658,946, issued Apr. 25, 1972, assigned to Badische Aniline-& Soda-Fabrik Aktiengesellschaft (BASF) discloses particle size and distribution of impact modified thermoplastics may be controlled by varying the stirrer speed or shear during the early part of the reaction.

U.S. Pat. No. 3,660,535, issued May 2, 1972, assigned to the Dow Chemical Company discloses stirring or mechanical agitation during the initial stages of polymerization to create the required particle size distribution in the polymerization of an impact modified thermoplastic.

U.S. Pat. No. 3,903,202, issued Sep. 2, 1975, assigned to Monsanto Company teaches dispersing under mechanical agitation a monomer syrup containing rubber into a partially polymerized monomer, during the early stages of polymerization to create the required dispersion of impact modifier throughout the resin phase.

U.S. Pat. Nos. 4,857,587 and 4,861,827, issued Aug. 15 and 29, 1989 respectively, assigned to Fina Technology Inc. discloses the use of mechanical agitation during the early stages of the polymerization of an impact modified thermoplastic to create the required dispersion of rubber throughout the continuous resin phase.

There are three patents which Applicants are aware of which state the control of shear is important in the process.

Canadian Patent 832,523 issued Jan. 20, 1970 to Shell Internationale Research Maatschappij N.V., teaches HIPS containing a bimodal particle size distribution. The HIPS comprises from 70 to 99 weight % of polystyrene and from 1 to 30 weight % of a dispersed rubber phase having a particle size distribution so that from 70 to 97% of the particles have a diameter from 1 to 3 microns and from 30 to 3% of the particles have a diameter from 5 to 25 microns.

The Shell patent teaches controlling agitation or shear during the early stages of polymerization to obtain the required particle distribution. The Shell patent teaches using the shear of a conventional process.

It is interesting to note that while the Shell patent also clearly contemplates blending impact modified polystyrenes (page 4, lines 10–15) and interpolymerizing styrene monomer containing two distinct types of rubber to obtain the required particle size distribution, it does not teach or disclose blending syrups having different particle size distributions and completing the polymerization to directly yield a product having a bi-modal particle size distribution.

U.S. Pat. No. 4,007,234, assigned to Hoechst A.G., issued Feb. 8, 1977 discloses a process for controlling the particle size distribution in high impact styrene copolymers modified with ethylene-propylene rubbers. The polymer is prepared using a mass/mass or mass/suspension process with high shear in the prepolymerizer. The resulting polymer is then subjected to a two stage shearing action. A catalyst is introduced into the polymer prior to or during the second shearing to crosslink the rubber particles and to maintain particle size. While the Hoechst patent teaches shearing the polymer, it does not disclose shearing the syrup as required in the present invention. Additionally, the rubber used in the Hoechst process is EPDM which is not used in the present invention.

U.S. Pat. No. 5,210,132, assigned to the Mitsui Toatsu Chemicals, Inc., issued May 11, 1993 discloses a process which forms a dispersed rubber-like composite phase in a continuous resin phase. The particulated syrup is then subjected to shear in a device having at least three shearing blades or rotors. The shearing rotors and stators are coaxial and have comb like cuts at interposing ends or sections to form a multilayer structure. The result is that the Mitsui patent teaches shearing a particulated syrup using a multi-zone shear field having at least three different shear rates. It is an essential feature of the Mitsui patent that the syrup be particulated prior to subjecting it to shear. The Mitsui patent teaches against the subject matter of the present invention in that the present invention relates to the particulation of a metastable syrup which is not particulated. Further, the cylindrical shear device of the Mitsui patent does not generate a relatively uniform shear field, required by the present invention. The shear field in the device of the Mitsui patent will vary radially outward from the centre of the cylindrical comb like rotor as a function of the distance from the centre of the rotor. In the cylindrical rotor and stator of the present invention there is only a single shear zone having a closely controlled shear field. A number of essential features of the Mitsui patent teaches away from the subject matter of the present invention.

None of the above art suggests a low shear process in which no or low mechanical agitation is used during the early stages of polymerization to produce a post inversion metastable syrup or additionally, to particulate a post inversion metastable syrup to a stable syrup in a relatively uniform shear field device. In the preferred embodiment of the present invention the shear field of the present invention is relatively uniform in that it is relatively free of shear pulsations (compared to more typical agitators in chemical processes such as turbines, anchors, propellers, screws, or helices). An example of a relatively uniform shear field is that generated between coaxial cylinders in which one or both of the cylinders rotate.

Metastable syrups have been studied from an academic perspective in small amounts. The prior art of impact modified thermoplastics clearly teaches that the dispersed rubber-like composite phase formed by phase inversion in plug flow reactors or batch processes or phase dispersion in CSTRs does not go through a post inversion metastable state.

There are a number of advantages of the process of the present invention. The invention permits a high degree of control over the particle size of a stable dispersed rubber-like composite phase by a rapid or step-like phase inversion of a metastable continuous or co-continuous rubber-like composite phase, additionally the process is easily modified by stream splitting and the application of multiple uniform shear field generating devices to produce bi- or multimodal particle size distributions all of which will lead to a better or better balance of properties.

Accordingly, the present invention seeks to provide for the industrial use of post inversion metastable syrups to provide additional degrees of freedom to control or manipulate the particle size distribution in impact modified thermoplastics.

As used in this specification the following terms have the following meanings:

"Dispersion" means a system of two or more phases in which one phase forms a continuous phase and the other phases are dispersed as small droplets or particles through the continuous phase;

"Resin phase" means a solution of polymer resin dissolved in one or more monomers or the polymer itself;

"Rubber phase" means an uncrosslinked rubber dissolved in one or more monomers, or the rubber itself;

"Rubber-like composite phase" means a composite of a rubber phase as defined above and one or more resin phases as defined above. Said composite may contain resin polymers occluded by or grafted onto the rubber polymers;

"Dispersed rubber-like composite phase" means a rubber-like composite phase dispersed throughout a continuous resin phase;

"Post inversion roetastable syrup" or "metastable syrup" means a syrup polymerized under low shear conditions past the normal phase inversion region described earlier for batch processes and plug flow reactors and consists of a rubber-like composite phase that is continuous or co-continuous with resin phase in a metastable free energy state [e.g. Gibbs or Helmholtz].

"Particulation" a term used to describe the formation of a dispersed rubber-like composite phase regardless of its mechanism;

"Dispersing" or "phase dispersion" or "particulation by dispersion" means the formation of a dispersed rubber-like composite phase in a continuous resin phase by dispersing with mechanical agitation a rubber phase or continuous rubber-like composite phase into a tank which has a continuous resin phase. Typically, this process occurs in a continuous stirred tank reactor (CSTR);

"Inverting", "inversion", or "phase inversion" or "particulation by inversion" means the formation of a dispersed rubber-like composite phase in a continuous resin phase from a syrup which has a continuous or co-continuous rubber-like composite phase.

"Rapid phase inversion" or "step like phase inversion" (as opposed to "inverting" or "phase inversion" or "particulation by inversion") means the particulation of a post inversion roetastable syrup in a relatively short time or small reactor volume to a stable syrup consisting of a dispersed rubber-like composite phase and a continuous resin phase;

"Low shear" means a shear field which is not sufficient to invert a metastable syrup. Low shear fields occur in static mixer reactors or during mechanical agitation of anchor or turbine agitators or other agitators operated at low rates of rotation. Typically with driven agitators the rates of rotations are less than 15, preferably less than 10 RPM's most preferably as low as possible. Of course, one skilled in the art will be aware that the degree of agitation will depend on reactor configuration and appropriate speeds can be determined by routine experimentation after reading this specification.

SUMMARY OF THE INVENTION

According to the broadest aspect of present invention there is provided, a process to produce a post inversion metastable syrup and subjecting said syrup to a shear field to yield a stable syrup comprising a dispersed rubber-like composite phase and a continuous resin phase.

The so treated syrup may be subsequently subjected to routine further polymerization and optionally devolatilized.

In a further preferred embodiment the post inversion metastable syrup may be divided into two or more streams, subjecting said syrup streams to different shear fields to form stable syrup streams comprising a dispersed rubber-like composite phase in a continuous resin phase and combining said streams to give a syrup with a bi- or multimodal particle size distribution.

The so treated syrup may be subsequently subjected to routine further polymerization and optionally devolatilized.

DETAILED DESCRIPTION

The process of the present invention is extremely broad in its application. For example, the at least a portion of the metastable syrup could comprise the entire syrup. On the other hand the metastable syrup could be divided into two or more portions each of which are separately subjected to a controlled shear field to cause inversion. Each portion may then be separately substantially polymerized to generate two or more different polymer products. In a particularly preferred embodiment the metastable syrup is divided into two or more portions, each of which is then subjected to a different controlled shear field to cause inversion. At least two of the resulting syrups are then combined and substantially polymerized to yield a product having at least two different particle size distributions of the dispersed rubber-like composite phase.

The impact modified polymers which may be prepared in accordance with the present invention include high impact polystyrene (HIPS), acrylonitrile butadiene styrene polymers (ABS) and methyl methacrylate butadiene styrene polymers (MBS). The monomers useful in accordance with the present invention for the formation of the thermoplastic polymer may be selected from the group consisting of $C_{8-12}$ vinyl aromatic monomers which are unsubstituted or substituted by a $C_{1-4}$ alkyl radical, $C_{1-8}$ alkyl esters of acrylic and methacrylic acids, maleic anhydride, and acrylonitrile or methacrylonitrile.

Suitable $C_{8-12}$ vinyl aromatic monomers which are unsubstituted or substituted by a $C_{1-4}$ alkyl radical include styrene, α-methyl styrene, p-methyl styrene, and p-t-butyl styrene. Useful $C_{1-8}$ alkyl esters of acrylic and methacrylic acids include methyl methacrylate, ethyl methacrylate, methyl acrylate, ethyl acrylate and ethylhexyl acrylate.

The resin component in the impact modified thermoplastic may comprise a co- or homo-polymer of one or more $C_{8-12}$ vinyl aromatic monomers which are unsubstituted or substituted by a $C_{1-4}$ alkyl radical. A suitable resin includes polystyrene. However, the resin may be a copolymer comprising from 5 to 95, preferably from 50 to 90 weight % of one or more $C_{8-12}$ vinyl aromatic monomers and from 95 to 5, preferably from 50 to 10 weight % of one or more monomers selected from the group consisting of $C_{1-8}$ alkyl esters of acrylic or methacrylic acids, and acrylonitrile or methacrylonitrile. Typically such polymers are copolymers of styrene and one or more monomers selected from the group consisting of acrylonitrile, methacrylonitrile, methyl acrylate, ethyl acrylate, methyl methacrylate, ethyl methacrylate, butyl acrylate, butyl methacrylate, ethylhexyl acrylate, and maleic anhydride. The resin may be a homo- or co-polymer of one or more $C_{1-8}$ alkyl esters of acrylic or methacrylic acids, preferably those listed above.

When finally finished the resin polymers should have a number average molecular weight greater than 65,000 preferably greater than 70,000 for the styrene containing polymers and a number average molecular weight of greater than 30,000 for the predominantly ester polymers.

Random rubber polymers which may be used as impact modifiers in the present invention will typically have a (weight average) molecular weight (Mw) of greater than about 100,000, preferably greater than 200,000. Block rubber copolymers have significantly lower molecular weight, typically greater than 50,000 {Mw}. The rubbers may be selected from the group consisting of:

(i) co- or homopolymers of $C_{4-6}$ conjugated diolefins which are unsubstituted or substituted by a halogen atom, preferably a chlorine or bromine atom;

(ii) random, block, linear, star and tapered copolymers comprising from 10 to 80 weight % of one or more $C_{8-12}$ vinyl aromatic monomers which are unsubstituted or substituted by a $C_{1-4}$ alkyl radical, and from 20 to 90 weight % of one or more $C_{4-6}$ conjugated diolefins; and (iii) copolymers comprising from 1 to 50 weight % of acrylonitrile or methacrylonitrile and from 50 to 99 weight % of one or more $C_{4-6}$ conjugated diolefins.

Suitable polymers which are co or homopolymers of $C_{4-6}$ conjugated diolefins include homopolymers of butadiene and copolymers of butadiene and isoprene. Preferably the polymer will be a homopolymer of butadiene. Generally the polymers have a level of stereospecificity. The selection of the degree of stereo specificity will depend to some extent upon the properties required in the final product. Some polybutadienes contain over 90, most preferably over 95 weight % of monomer in the cis configuration. Such a type of polymer is commercially available from Polysar Rubber Corporation under the trademark TAKTENE®1202. The polybutadiene may contain a lower amount, typically from 50 to 65, most preferably about 50 to 60 weight % of monomer in the cis configuration such as polymers which are available from Firestone under the trademark DIENE®55 or from the Polysar Rubber Corporation under the trademark TAKTENE®550.

Suitable rubbery polymers may comprise: from 10 to 80, preferably from 20 to 50 weight % of one or more $C_{8-12}$ vinyl aromatic monomers which are unsubstituted or substituted by a $C_{1-4}$ alkyl radical, and from 20 to 90, preferably from 80 to 50, weight % of one or more $C_{4-6}$ conjugated diolefins. Such rubber polymers may be random or block such as linear block, star block or tapered block polymers.

Random copolymers having the above composition are the commercially available styrene butadiene rubbers (SBR). A number of block copolymers are available from Shell under the trademark KRATON®.

The rubbery polymer may comprise from 1 to 50, preferably from 5 to 35 weight % of acrylonitrile or methacrylonitrile, and from 50 to 99, preferably from 95 to 65 weight % of one or more $C_{4-6}$ conjugated diolefins.

The above polymers are the commercially available nitrile rubbers available from Polysar Rubber Corporation under the trademark KRYNAC® and from Bayer AG under the trademark PERBUNAN®.

It should be kept in mind that the rubber should be soluble in one or more of the monomers of the thermoplastic or the diluent or solvent for the monomers. The solubility of the above rubbers in various monomers and/or diluents or solvents may be easily determined by non-inventive routine testing.

Typically, from about 1 to 20, preferably from 3 to 12, most preferably from about 4 to 10 weight % of the rubber is dissolved in the monomer or a mixture of monomers to form a syrup. The syrup is then polymerized, under no or low shear or low mechanical agitation conditions, either thermally or in the presence of one or more initiators. Typically, in accordance with the invention, the syrup is polymerized to a degree of conversion of greater than 5, preferably from 10 to 75 most preferably from about 15 to 65%.

The metastable syrup may also be prepared by adding to a partially polymerized mixture of monomers and uncrosslinked rubber a rubber concentrate comprising from 10 to 30 weight % of one or more uncrosslinked rubbery polymers in a fluid medium comprising one or more members selected from the group consisting of monomers, solvent, process oil and liquid plasticizers, and partially polymerizing the resulting mixture under low shear so that the rubbery phase forms a metastable continuous or co-continuous phase and optionally, in a further separate step diluting the partially polymerized mixture with one or more additional monomers.

Metastable syrups may be handled industrially provided there is not a significant shear on the syrup to cause it to phase invert. The syrup may be handled using low shear methods such as low shear pumps, gravity feeds or vacuum and pressure techniques.

A reactor having low mechanical shear such as a plug flow reactor may be used to produce a metastable syrup. Upon being subjected to the process of the present invention the rubber phase will become a dispersed rubber-like composite phase distributed throughout the continuous resin phase as particles.

A useful indication of particle size is reflected by the volume average particle diameter. The volume average particle diameter is given by the ratio of the fourth moment of the particle size distribution to the third moment of the particle size distribution.

$$\text{Volume Average diameter} = \frac{\Sigma n_i d_i^4}{\Sigma n_i d_i^3}$$

wherein $n_i$ is the number of all particles having diameter $d_i$ summed over all particles.

Often, but not invariably, the dispersed particles have a log normal distribution and the particle size density distribution is given by:

$$p(x) = \frac{1}{\sqrt{2\pi} \, \sigma x} \exp\left(-0.5\left(\frac{\ln x - \mu}{\sigma}\right)^2\right)$$

where $p(x)$ is the particle density at diameter $x$, $\mu$ is a parameter indicating the location of the distribution, and $\sigma$ is a parameter indicating the spread or breadth of the distribution. In cases where the particle size distribution is log normal these two parameters, $\mu$ and $\sigma$, uniquely determine the distribution.

A useful (final) particle size may be characterized as a particle size having a volume average particle diameter from 0.01 to 15 micrometers. Preferably for high impact polystyrene type systems the volume average particle diameter will be from 0.5 to 15 micrometers. Preferably for the ABS, MBS and the ester (e.g. acrylate and methacrylate) resin type systems the volume average particle diameter will be from 0.05 to 5 micrometers. As noted above there are a number of bi- and poly- modal particle size distributions which give useful properties. These useful multimodal distributions do not have log normal particle size distributions. Generally useful bi- or poly- modal particle size distribution comprises from 100 to about 40% of small particles from about 0 to about 60% of medium sized particles and from 0 to 20 weight % of particles outside the specified sizes for small and medium particles. The ratio of diameters of small to medium particles may range from 1:1.15 to 1:20 preferably from 1:1.3 to 1:6.

If the metastable syrup is subjected to a treatment which uses shear to input sufficient energy into the syrup to permit the total energy in the system to rise above the "energy well or valley" defining the roetastable state then the syrup will go to a lower energy more stable state in which the resin phase (partially polymerized polymer in monomer(s)) forms the continuous phase and the rubber-like composite phase will be the discontinuous phase.

The energy input into the syrup may be through the use of a controlled shear device. The controlled shear device may comprise a stator and a rotor, optionally with an adjustable gap therebetween, and a controlled or determined path length through which the syrup must flow.

The device may comprise a tubular stator member, such as a straight or tapered pipe. Inside the tubular member is a closed cylinder or cone which is the rotor. Preferably the rotor is movable within the stator to control either or both the clearance between the rotor and stator and the path length over which the fluid is subjected to shear. More particularly the device may be a Couette fluid shear generator comprising:

(i) a chamber having a circular cross section perpendicular to its longitudinal axis and at least one input port and at least one output port;

(ii) a cylinder within said chamber, said cylinder having a circular cross section perpendicular to its longitudinal axis, a surface closely conforming to the internal surface of said chamber and occupying substantially all the space within said chamber except for a closely controlled clearance between the internal surface of the chamber and the external surface of the cylinder; and (iii) means for rotating at least one of said chamber and said cylinder relative to each other.

The internal shape of the chamber and the external shape of the cylinder (e.g. closed not annular) conform and typically have a circular cross section perpendicular to the longitudinal axis. Suitable shapes for the chamber and rotor include cylindrical, frustro-conical (tapered cylindrical), and conical. Spherical, hemi-spherical and parabolic shapes would likely be useful but may be more difficult to use in plant operations. A special shape would be a plate shaped stator or chamber and a plate shaped rotor. A further special configuration is a plate shaped stator with a conical shaped rotor or conical stator with plate shaped rotor.

Suitable ratios of dimensions for the shear field generator will depend upon the required residence time, the diameter of the rotor and the chamber and the speed of rotation. Clearance between the chamber wall and the surface of the rotor may be defined in terms of the ratio of the radius of the rotor (rr) to the radius of the chamber (rc). Typical ratios range from 0.999 to 0.750, preferably from 0.993 to 0.875. The ratio of the length to the diameter of the chamber (L/D ratio) should be greater than 0.25:1, preferably between 0.5:1 to 10:1, most preferably between 0.5:1 to 3:1. Preferably the input and output ports should be located at opposite ends of the chamber.

A relatively uniform controlled shear may also be provided by flowing said syrup through a device defining a closed chamber having a circular cross section perpendicular to its longitudinal axis, a continuous side wall and a conical projection along its longitudinal axis, said conical projection having a low apical angle, a planar end perpendicular to the longitudinal axis of said chamber and placed adjacent the apex of said conical projection and means for rotating said conical projection and said plate relative to each other. The apical angle is less than, 7 preferably less than 4, most preferably less than 2°. The gap between the tip of the cone and the plate should be minimal.

Typical shear rates range from about 2 to 2000 sec.$^{-1}$, preferably from about 4 to 1000 sec.$^{-1}$.

The residence time of the syrup as it flows through the device should approach the minimum time to obtain the required results. Typically the residence time should be less than 10 minutes, preferably less than 5 minutes, most preferably less than 3 minutes. Of course, the residence time will depend on the free volume within the chamber and the flow rate through the device.

The rotor should be attached to a drive means capable of driving the rotor at speeds up to several hundreds's RPM's. For most operations the rotor should be capable of operating at speeds between about 5 and about 500, typically from about 10 to 250 RPM's.

In view of the relatively short residence time of the syrup as it passes through the device, the present invention provides a process in which there is a very short transition time between grades of impact modified thermoplastic having the same amount of rubber and a different particle size distribution.

The above disclosure has been written in terms of a device to impart shear to the syrup. One of the advantages of the present invention is that the syrup may be divided into a number of streams and each stream may be individually treated and then two or more of the streams may be combined and further substantially polymerized. Such a procedure permits the formation of bi or multi modal particle size distribution within the syrup. Accordingly, it is possible to select or control the particle size distribution within the system to try to maximize several finished property properties such as gloss and toughness.

In accordance with the present invention it is possible to add additional resin monomers to the so treated inverted syrup (i.e. one in which the rubber phase is the dispersed phase). Suitable resin monomers have been discussed above.

The present invention offers several additional distinct advantages over the existing technology. Until the polymerization has progressed to such a degree to fix the particle size distribution of the uncrosslinked rubber it is possible to further alter the particle size distribution. The process of the present invention may be used to lower or to alter the particle size distribution of the uncrosslinked rubber phase.

Care should be taken in practising the process of the present invention. It is believed that under extreme conditions of shear and pressure it is possible to departiculate a particulated syrup to a post inversion metastable syrup in which the rubber-like composite phase and resin phase are continuous or co-continuous.

The point between altering the volume average diameter of the dispersed rubber-like composite phase and departiculation will depend on a number of factors including the type and configuration of equipment used, the degree of polymerization of the syrup and the viscosity of the syrup. While it is difficult to scale up from laboratory equipment to plant scale equipment the relative magnitudes of shear and pressure on each side of the crossover point may be examined using a high shear device such as a gear pump with a restricted discharge port. Several samples of the syrup may be placed in a high shear and pressure device and subjected to different shear rates and pressures. The resulting samples are then polymerized in a glass tube to completion and the product is then analyzed by the test for particulation and TEM (as set forth below) to determine the effect of shear and pressure on the syrup. By observing the morphology of the sample and correlating it to shear rate and pressure it may be possible to define the conditions where the crossover point from altering the particle size distribution of the dispersed rubber-like composite phase to departiculation to a roeta-stable syrup. Generally, it is believed that the shear rates and pressures to cause the syrup to departiculate to a metastable syrup are quite high. Using such a procedure it is also possible to define or plot a graph indicating the relationship between particle size and shear.

After an appropriate particle size distribution of uncrosslinked rubber has been obtained in the syrup, the syrup may be polymerized in a conventional manner. The morphology of the rubber particles in the resin phase will be fixed as the rubber becomes crosslinked. The syrup will pass through one or more reactors to raise the conversion to as close to complete as possible without degradation of the product and within the time limits of "normal" commercial processes for polymerization. Typically this conversion will be greater than 65% preferably from about 70 to about 90%. The syrup will then be fed to a preheater and devolatilized in a conventional manner. The devolatilized polymer may then be extruded as strands and chopped into pellets.

From an apparatus point of view the present invention provides a suitable apparatus for the polymerization of impact modified polymers in cooperation with one or more devices to input shear into the syrup, preferably a Couette shear field generating device. For the sake of simplicity the type of device useful in accordance with the present invention will be described in the context of devices used for an impact modified polymer such as high impact polystyrene (HIPS) which will be described in relationship to FIG. 1 which is a schematic drawing of a plant for the polymerization of such an impact polymer using three reactors.

Figure 1:
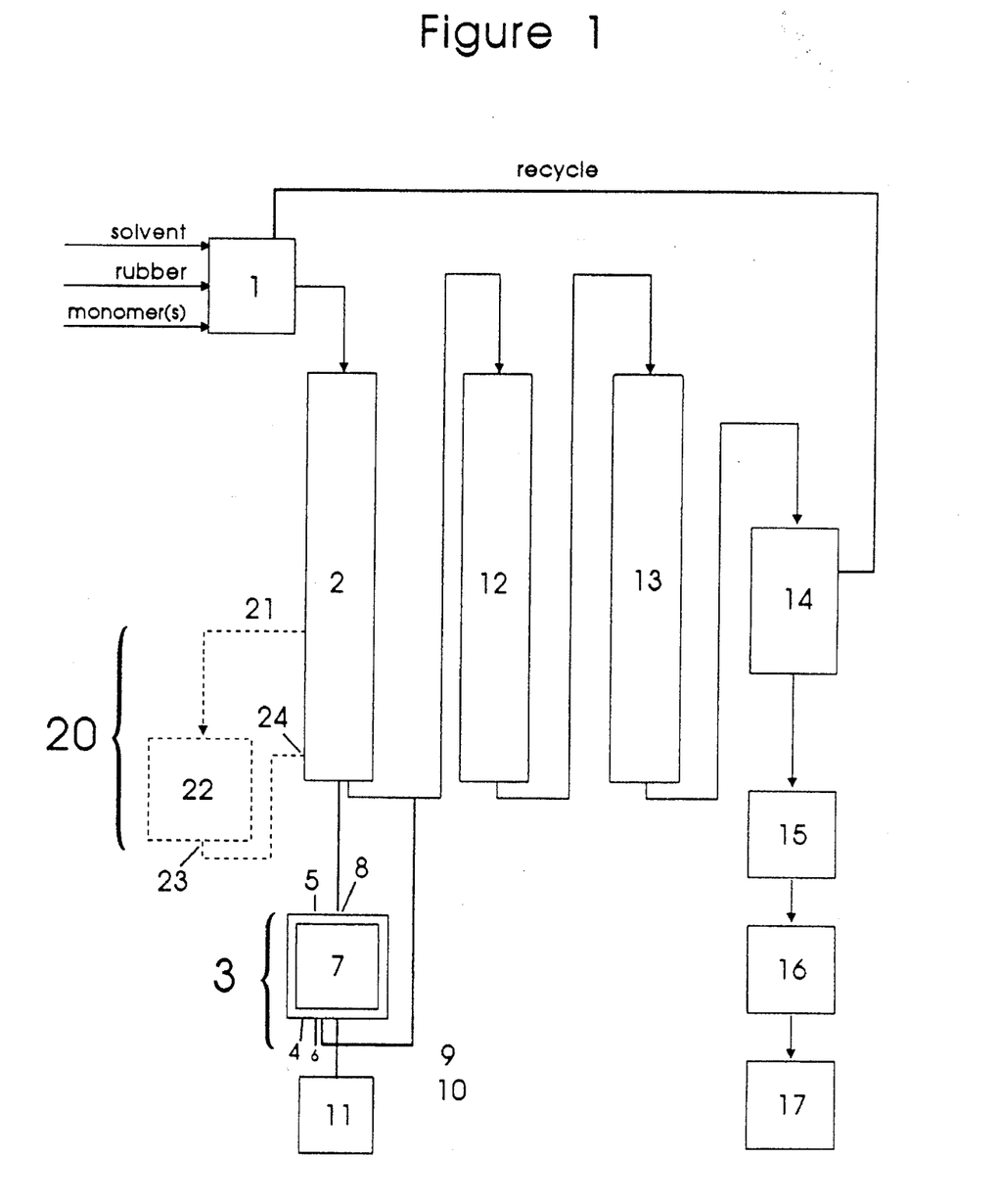
FIG. 1 is a schematic drawing of a plant for the production of an impact modified polymer such as high impact polystyrene (HIPS) by a continuous mass polymerization using a sequence of reactors.

Typically in the polymerization of an impact modified polymer, up to about 20 weight %, preferably from about 3 to 12 weight %, most preferably from about 4 to about 10 weight % of rubber, is dissolved in one or more monomers, and optionally solvent, in a dissolver tank 1. The solution of rubber in monomer and optionally solvent is then fed to a first reactor 2, in a series of, in this case three, horizontal or vertical reactors. The monomers are partially polymerized in reactor 2 under low shear (with no or very low agitation) to form a syrup in which the continuous phase is the rubber-like composite phase and the discontinuous or co-continuous phase is the resin phase (e.g. monomer and polymer). The syrup leaves reactor 2, and all or part of the syrup passes through one or more Couette shear field generator(s) (particulator(s)) generally indicated at 3. While not shown in the drawings the syrup from reactor 2 may be passed to two or more particulators to generate a bi- or multi- modal particle size distribution.

The Couette shear field generator comprises a closed chamber 4 having ends 5 and 6, and a circular cross section perpendicular to its longitudinal axis (preferably cylindrical) and having within it a rotor 7 closely conforming to the shape of the chamber. The rotor substantially occupies the volume of the chamber except for a closely controlled gap. The gap between the internal surface of the chamber 4 and the external surface of the cylinder 7 is small and closely controlled. Chamber 4 has an inlet 8 and an outlet 9. Drive means 10 passes through one of the closed ends, in this case 6, of chamber 4. The drive means is attached to a power means 11, such as an electric motor.

The syrup from reactor 2, then is transferred into second reactor 12 where more of the resin phase is polymerized. While not shown in the drawings it would be possible to have all or part of the syrup leaving reactor 12 pass through one or more particulators.

The syrup from reactor 12 is then transferred to reactor 13 where the resin phase is further polymerized. While not shown in the drawings it would be possible to have all or part of the syrup leaving reactor 13 pass through one or more particulators.

The syrup from reactor 13 then is passed to a devolatilizer 14. In the devolatilizer most of the residual monomer and solvent are removed from the syrup. The monomer and solvent are recycled.

The product then passes through a die plate 15, from which the product is extruded as strands. The strands pass through a cooling step 16. Typically the strands pass through baths of cooling water. The strands are then pelletized in a pelletizer 17.

As shown in the broken lines it would be possible to place a particulator 20, at a location other than the exit from the first reactor. For example, reactor 2 could have an exit port 21, somewhere prior to the end of the reactor. The exit port 21 could be connected to inlet 22 of particulator 20. The syrup would pass through the particulator 20 and leave the particulator's outlet 23 and be returned to rector 2 by an inlet port 24 which is down stream from outlet port 21. Additionally, the couette field generator could be located at the exit of any reactor, provided the rubber had not crosslinked and the syrup is in a metastable state. A further alternative could be to place the couette field shear generator immediately prior to the devolatilizer 14.

The Couette shear field generator may be used in a number of ways. A stream of metastable syrup could be split into two or more streams each of which could be treated to generate a particular particle size distribution. The streams could then be blended and the polymerization finished. This would permit the production of a product with two or more particle size distributions for the dispersed rubbery phase so that a number properties could be enhanced for example such as toughness and gloss.

It will be recognized that the above description is of one embodiment of the invention. Other configurations and applications for the present invention will be apparent to those skilled in the art.

EXAMPLES

The present invention will be illustrated by the following examples which are not intended to limit the invention. In the examples, unless otherwise indicated, parts means parts by weight and % means weight %.

Controlled shear device

For laboratory scale experiments a Couette shear field generating device (particulator) was custom made. The device contained a cylindrical chamber 6 inches deep and 2 inches in diameter (an L/D ratio of 3:1). The chamber had an external heating jacket with two ports to flow hot oil through, which were connected to a heating/circulating oil bath to provide temperature control. The top of the chamber was removable. A drive shaft passed through a seal in the top of the chamber. One end of the drive shaft was attachable to an electric motor and the other end was attachable to a cylindrical rotor. Several cylindrical rotors were machined for the device. The rotors essentially filled the chamber. The rotors were machined to provide the following wall clearances between the surface of the rotor and the surface of the chamber: 0.03125, 0.06250, 0.1250 and 0.2500 inches. When the rotors were installed in the device the following volumes were obtained: 19.0, 37.0, 72.4, 135.0 mL, respectively. At the bottom of the chamber was an inlet port to flow syrup into the chamber and at the top of the chamber was an outlet port to permit the flow of treated syrup out of the device. The shear rate the syrup was exposed to in the device could be changed by varying the rotor rpm or the rotor gap. Syrup temperatures were measured at the inlet and outlet of the device and recorded. The entire device was made from stainless steel.

Continuous Stirred tank reactor (CSTR)

The CSTR was a glass 1.0 L vessel equipped with a bottom outlet port. The reactor has a external heating jacket with ports to flow hot oil through and was connected to a heating circulating oil bath to provide temperature control. The top of the reactor was removable and equipped for mechanical agitation. A drive shaft passed through a seal in the top of the reactor. One end of the drive shaft was attachable to an electric motor and the other end was attachable to an agitator. Batch (syrup) temperature was measured in the middle of the reactor and recorded. The temperature in all transfer lines were controlled.

Static mixer reactor (SMR)

The static mixing reactor consisted of three modules that were 11 ½" long by 1 ½" in diameter, contained Sulzer SMX mixing elements and were approximately 350 mL in volume. Valves were placed between each module for sampling. Each module had an external heating jacket with two ports to flow hot oil through and were connected to its own heating/circulating oil baths to provide individual temperature control. Batch (syrup) temperatures were measured at the inlet and outlet of each module and recorded. The temperature in all transfer lines was controlled. The entire reactor was made from stainless steel.

Laboratory scale reactor train (type-I)

The feed solution was fed from a dissolving tank to a gear pump which delivered the feed solution to the bottom inlet port of the static mixer reactor. The syrup exited the static mixer reactor through the top outlet port and was delivered to the bottom inlet port of the controlled shear device. The syrup exited the top outlet port of the controlled shear device and was collected for analysis or advancement.

Laboratory scale reactor train (type-II)

The feed solution was fed from a dissolving tank to a gear pump which delivered the feed solution to a CSTR. The CSTR was operated at a low solids level with a stable non-particulated rubber-like composite phase, as shown by the Test for Particulation described below. The syrup exiting the bottom port of the CSTR and entered a second gear pump and was delivered to the bottom inlet port of the static mixer reactor. The syrup exited the static mixer reactor through the top outlet port and was delivered to the bottom inlet port of the controlled shear device. The syrup exited the top outlet port of the controlled shear device and was collected for analysis or advancement.

Polymerizations

Using one of the above reactor trains a series of experiments were carried out. Styrene containing between 4 and 8 weight % of a medium cis or high cis rubber was polymerized by thermal or 0.028% t-butylperoxyacetate initiation. Samples of the resulting syrup were taken after the CSTR (when used), each module of the static mixer reactor and after the controlled shear device. The syrup samples analyzed as is or were advanced at 140° C. for 24 hours and then devolatilized at 220° C. for 30 minutes in a vacuum oven under reduced pressure (~5 mm Hg). The resulting samples of rubber modified polystyrene then subjected to analysis.

For mechanical testing the devolatilized polymer was pelletized and molded in a standard ASTM test piece mold.

The syrup that exited the static mixer reactor was past the normal inversion point and was considered to be in a roetastable state with a continuous or co-continuous rubber-like composite phase as shown by the Test for Particulation, below.

Test for Particulation

Three tenths of a gram of a devolatilized HIPS resin is shaken in 15 ml of 2-butanone (MEK) and inspected for visible gel particles. A well particulated HIPS resin will appear as a milk like suspension, while a non-particulated HIPS resin (one with a co- or continuous rubber phase) will appear as a single gel particle in a clear solution. "Partially particulated" HIPS resins are ones that fall between these two extremes.

Measurement of Swelling Index and Gel Content

Approximately one gram of polymer is accurately weighed and dissolved in 40 mL toluene and centrifuged at 17,000 rpm, at −7° C., for two hours. The supernatant liquid is decanted, 40 mL of fresh toluene is added to the precipitated gel, and the mixture treated in an ultrasonic bath for two hours. The sample is then centrifuged at 17,000 rpm and −7° C. for two hours. The supernatant liquid is decanted. The wet gel is weighed and then dried and weighed again. The swelling index is calculated by dividing the wet gel weight by the dry gel weight, and the gel level is calculated by dividing the dry gel level by the initial sample weight.

Particle Size Measurement

An Horiba photosedimentometer was used for particle size analysis. A typical procedure involves dispersing enough HIPS resin such that the starting absorbance of the instrument lies between 0.75 and 0.85 in 10 mL of MEK. The sample is inspected for complete dispersion and is measured immediately in centrifugal mode. The machine reports area median. The output was fitted to a log normal distribution, where appropriate, to calculate the appropriate values for the characterization of the particle size distribution.

Transmission Electron Microscopy (TEM) and
Dispersed Phase Volume Fraction Analysis (DPVF)

TEM were taken of selected samples using routine methods.

Syrup Solids

Syrup solids were determined using gravimetric analysis by devolatilizing the sample at high temperature (220° C.) and reduced pressure (5 mm Hg).

The following examples will illustrate the application of the present invention.

EXAMPLE 1

The feed syrup comprised 4% high cis polybutadiene and 0.028% t-butylperoxyacetate in styrene. The syrup was fed at a rate of 440 mL/hr into the type I reactor train and was initiated. The jackets of the static mixer reactor (SMR) were operated in increasing temperature 126°, 126°, and 131° C. and the particulator jacket was maintained at 120° C. The 0.125 inch wall clearance spindle was used in the particulator and was operated at various RPM.

The results of the example are set forth in Table I

TABLE I

RESULTS OF EXAMPLE 1

| Reactor | Syrup Solids (%) | Spindle RPM | Volume Average Diameter (μM) |
|---|---|---|---|
| Exit of SMR | 19.10 | Metastable Syrup | |
| Particulator | 22.04 | 5 | Partially Particulated |
| Particulator | 19.18 | 10 | 5.38 |
| Particulator | 24.89 | 20 | 2.54 |
| Particulator | 21.98 | 40 | 2.06 |
| Particulator | 22.53 | 80 | 1.72 |
| Particulator | 20.40 | 160 | 2.27 |
| Particulator | 18.99 | 260 | 1.81 |

EXAMPLE 2

The feed syrup comprised 8 % medium cis polybutadiene in styrene. The syrup was fed at a rate of 448 mL/hr into the type I reactor train and was thermally initiated. The 0.125 inch wall clearance spindle was used in the particulator and was operated at various RPM.

The results of the example are set forth in Table II

TABLE II

RESULTS OF EXAMPLE 2

| Reactor | Syrup Solids (%) | Spindle RPM | Volume Average Diameter (μM) |
|---|---|---|---|
| Particulator | 30.26 | 40 | 9.20 |
| Particulator | 36.61 | 80 | 5.97 |
| Particulator | 37.04 | 160 | 4.66 |
| Particulator | 27.73 | 260 | 2.58 |

EXAMPLE 3

The feed syrup comprised 4% high cis polybutadiene and 0.028% t-butylperoxyacetate in styrene. The syrup was fed at a rate of 876 mL/hr into the type II reactor train and was initiated. The jacket temperatures were operated as follows: CSTR=120° C., SMR=118°, 118° and 120° C., in order of increasing temperature and the particulator=120° C. The 0.0625 inch wall clearance spindle was used in the particulator and was operated at various RPM.

The results of the example are set forth in Table III

TABLE III

RESULTS OF EXAMPLE 3

| Reactor | Syrup Solids (%) | Spindle RPM | Volume Average Diameter (μM) |
|---|---|---|---|
| Exit of SMR | 20.96 | Metastable Syrup | |
| Particulator | 21.85 | 20 | 3.32 |
| Particulator | 22.02 | 40 | 2.73 |
| Particulator | 21.61 | 80 | 1.72 |
| Particulator | 21.91 | 160 | 0.94 |
| Particulator | 22.05 | 260 | 0.66 |

EXAMPLE 4

The feed syrup comprised 8% medium cis polybutadiene and 0.028% t-butylperoxyacetate in styrene. The syrup was fed at a rate of 876 mL/hr into the type II reactor train and was initiated. The jacket temperatures were operated as follows: CSTR=120° C., SMR=123°, 123° and 125° C., in order of increasing temperature and the particulator=120° C. The 0.0625 inch wall clearance spindle was used in the particulator and was operated at various RPM.

The results of the example are set forth in Table IV.

TABLE IV

RESULTS OF EXAMPLE 4

| Reactor | Syrup Solids (%) | Spindle RPM | Volume Average Diameter (μM) |
|---|---|---|---|
| Exit of SMR | 29.40 | Metastable Syrup | |
| Particulator | 29.95 | 10 | 3.80 |
| Particulator | 30.17 | 20 | 2.75 |
| Particulator | 31.27 | 40 | 2.67 |
| Particulator | 30.82 | 80 | 2.22 |
| Particulator | 31.06 | 160 | 1.99 |
| Particulator | 30.60 | 260 | 1.55 |

The above data demonstrate that it is possible to control particle size distribution using the process of the present invention. More specifically the data within each table show syrups which had the same chemical composition and essentially similar conversions can be particulated to produce a different particle size distribution. Additionally the results show that metastable syrups can be particulated by the process of the present invention. The data illustrates that the process is useful with various types of rubber, at various levels of rubber and different types of initiation.

Figure 2:
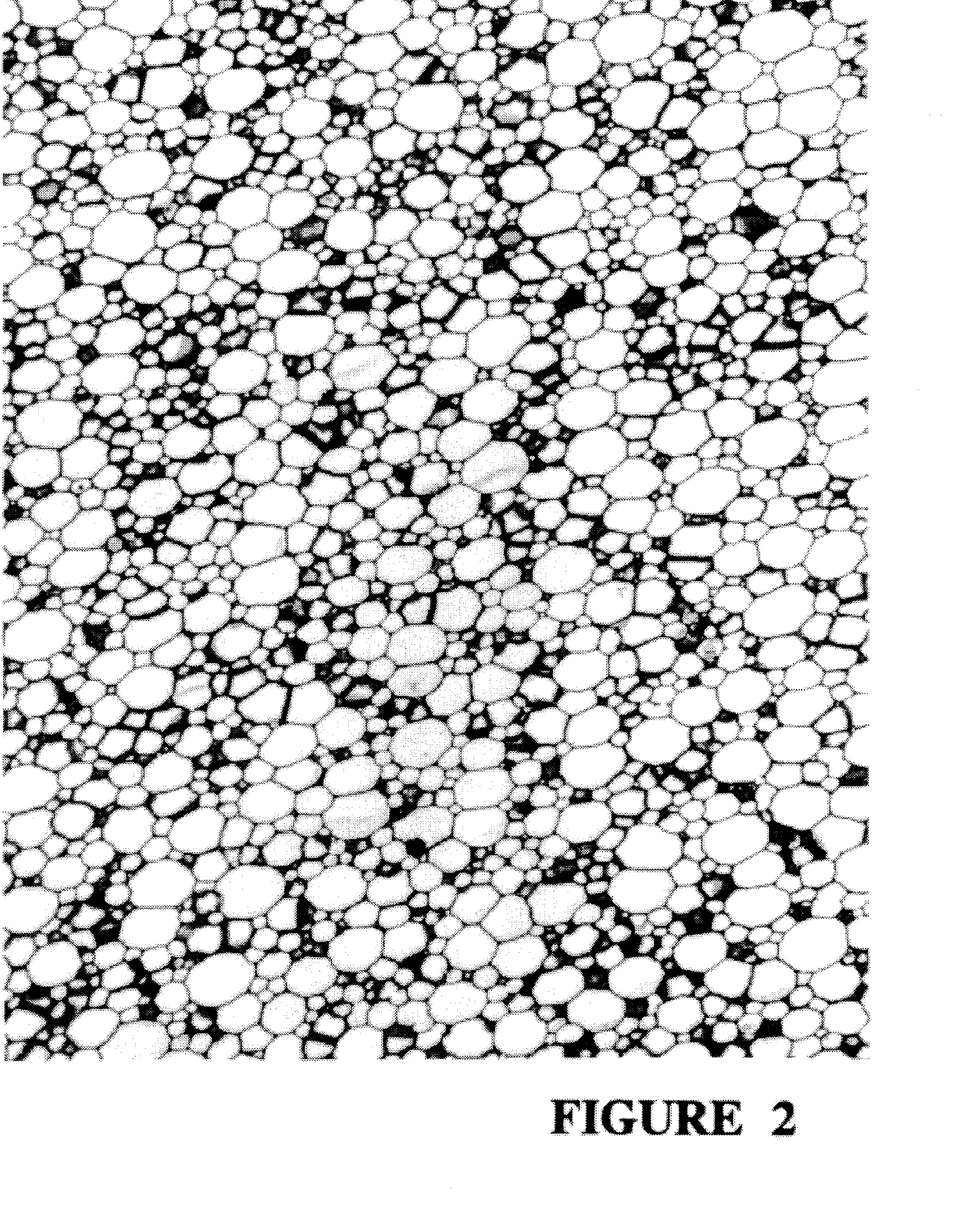
FIG. 2 is a transmission electron micrograph of an advanced and devolatilized metastable syrup in which the rubber phase is continuous. In the figure the rubber phase is black and the resin phase is white.

FIG. 2 is an electron micrograph (7,500 X) of a metastable syrup advanced to completion. In the figure the dark area is the rubber-like composite phase and the is continuous. The clear area is the resin phase which is discontinuous.

Figure 3:
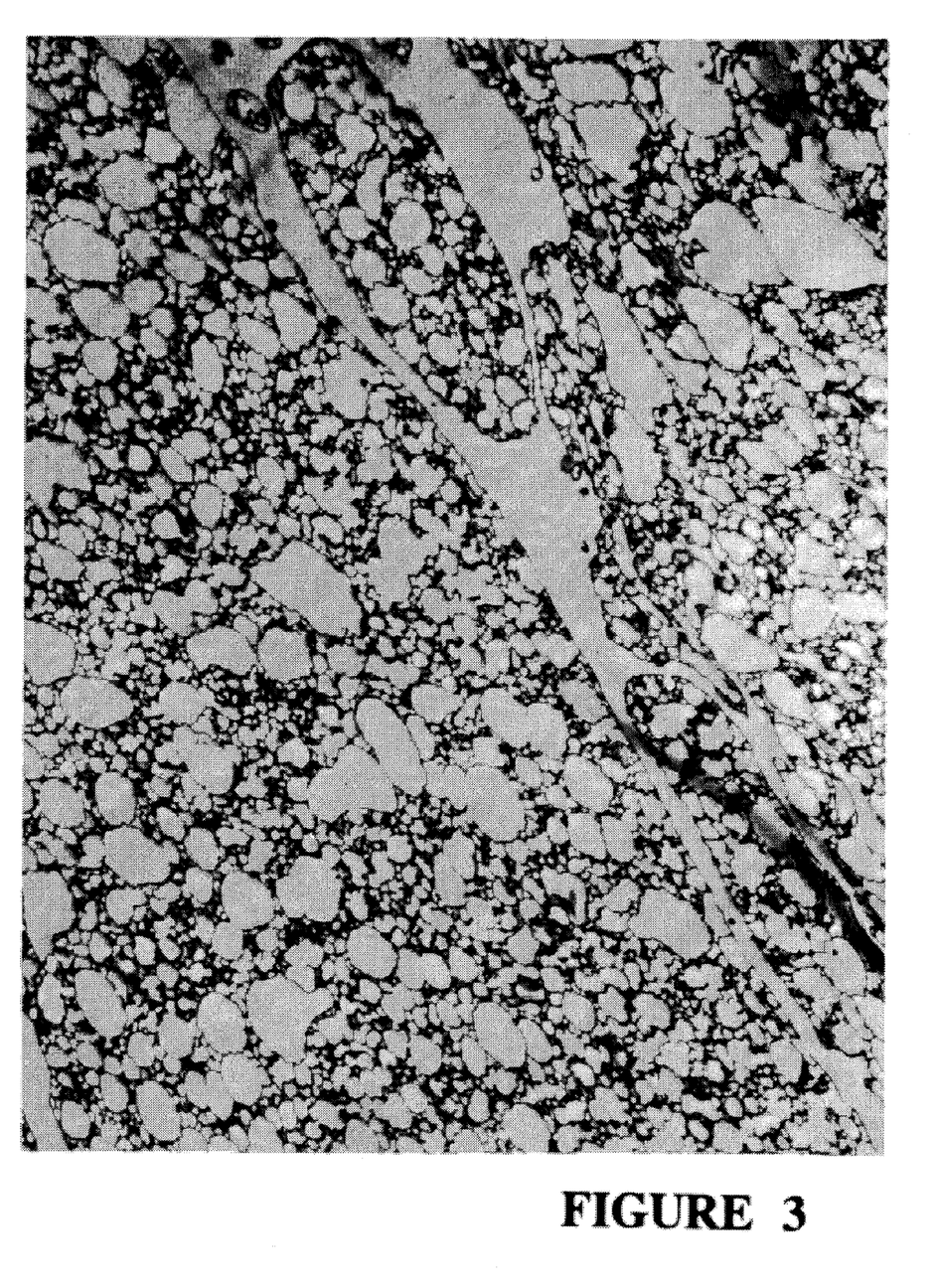
FIG. 3 is a transmission electron micrograph of an advanced and devolatilized post inversion roetastable syrup in which the rubber-like composite phase and the resin phase are co-continuous. The sample was taken from the static mixer reactor of Example 4 at 29.43% solids.

FIG. 3 is an electron micrograph (7,500 X) of a sample of syrup exiting the plug flow reactor and advanced to completion. In the figure the composite rubber-like composite phase is dark and the resin phase is light. In the figure the like-rubber composite phase is either continuous or co-continuous with the resin phase, the syrup has not inverted.

Figure 4:
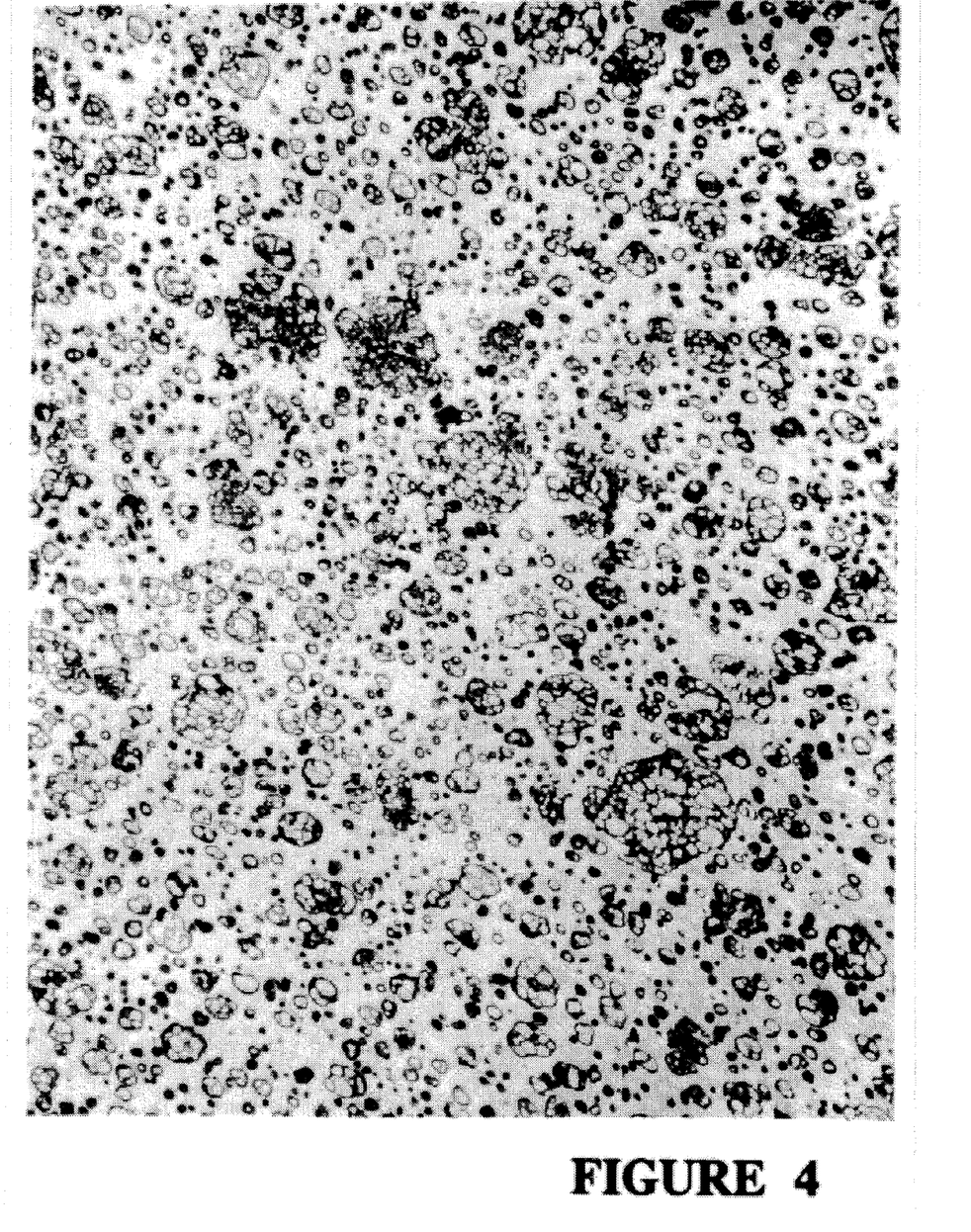
FIG. 4 is a transmission electron micrograph of a advanced and devolatilized stable syrup. The syrup was prepared from the post inversion metastable syrup shown in FIG. 3 by flowing it through the controlled shear device (the spindle was rotating at 40 RPM), which induced a rapid phase inversion. The sample was taken after the controlled shear device of Example 4 at 31.27% solids.

FIG. 4 is an electron micrograph (7,500 X) of a sample of syrup taken from the particulator operating at 40 RPM. Clearly the sample has now inverted and the resin phase is continuous and the rubber-like composite phase is discontinuous.

Figure 5:
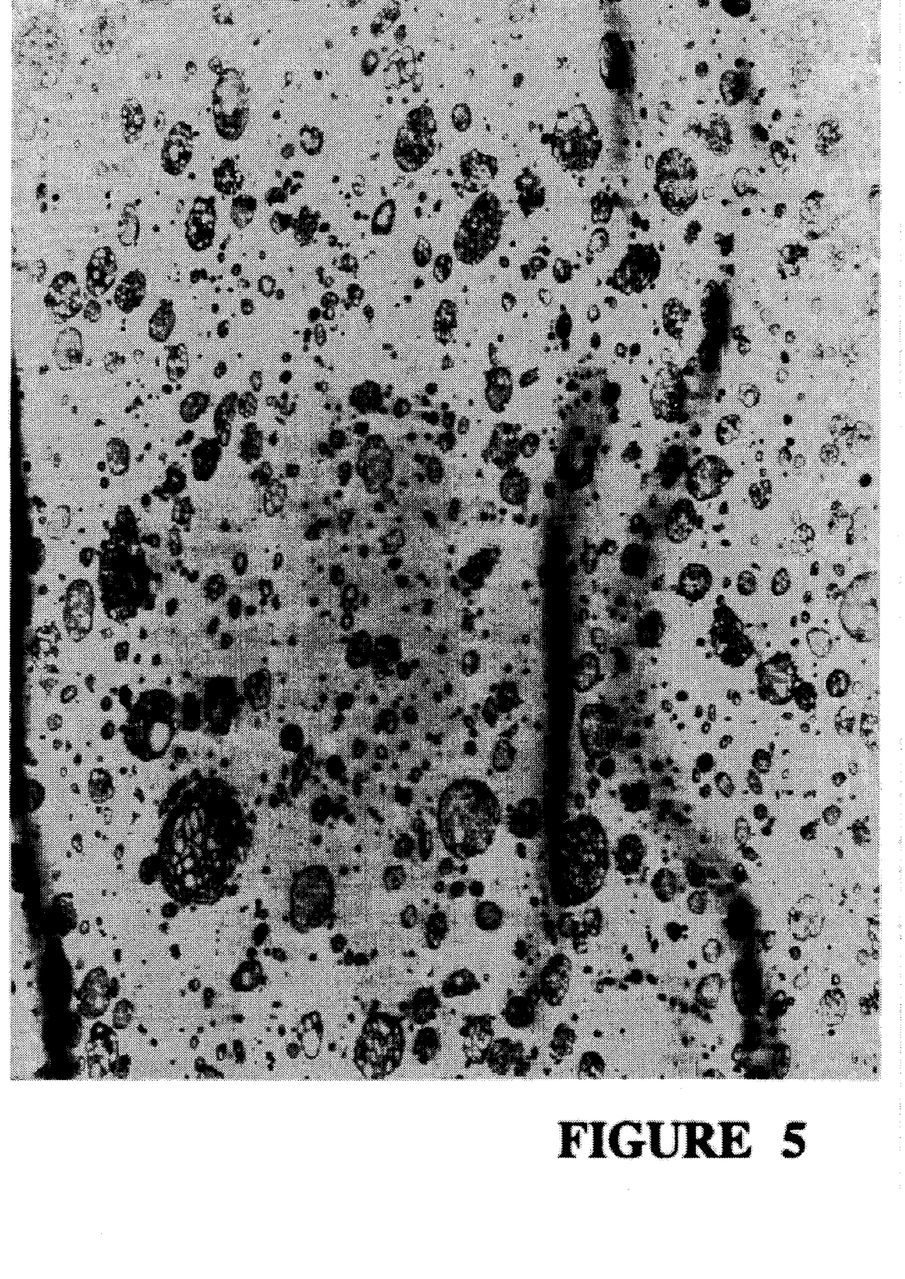
FIG. 5 is a transmission electron micrograph of a high impact polystyrene prepared using a conventional process.

For comparison purposes figure is an electron micrograph (7,500 X) of a high impact polystyrene prepared using "conventional" technology ( e.g. inversion or dispersion technology).

EXAMPLE 5

A styrene feed solution containing 4.25 weight % of medium cis polybutadiene, 0.028 weight % of t-butylperoxyacetate and 0.5 weight % of mineral oil was polymerized in the previously described type II polymerization apparatus. The syrup exited the Couette shear field generating device at 22% solids. The wall clearance in the device was ¹⁄₁₆ inch and the rotor was operated at 20 RPM. The samples in accordance with the present invention were then advanced to a high solids (>95%), devolatilized and pelletized, as described previously. Test specimens were then prepared from the experimental resin and were compared to a standard commercial resin of comparable formulation prepared using conventional polymerization technology. The tests and the results are set forth in Table V.

TABLE V

| TEST | CONVENTIONAL PROCESS | PROCESS OF THE INVENTION |
|---|---|---|
| MELT FLOW INDEX (g/10 min.) ASTM D1238 | 3.1 | 1.6 |
| ORIENTATION (%) | 39 | 42 |
| IZOD (ft-lbs/in.) ASTM D256 | 0.80 | 1.29 |
| TENSILE YIELD (PSI) ASTM D638 | 5740 | 4870 |
| TENSILE FAIL (PSI) ASTM D638 | 5600 | 5610 |
| ELONGATION (%) | 22 | 42 |

The samples were then subjected to instrumented impact testing to measure the peak load (units) the energy to the peak load and the total energy. The results are set forth in Table VI.

TABLE VI

| TEST | CONVENTIONAL PROCESS | PROCESS OF THE INVENTION |
|---|---|---|
| PEAK LOAD (lb) | 169.4 | 193.5 |
| ENERGY TO PEAK (in/lb) | 38.7 | 43.8 |
| TOTAL ENERGY (in/lb) | 64.5 | 82.1 |

It was also noted subjectively, that the test samples prepared from the resin prepared in accordance with the present invention had improved translucency over the samples prepared from resin prepared in accordance with the prior art. This is a most interesting observation as it show that it is possible using the process of the present invention to improve both toughness and transparency, which was not considered possible using the processes of the prior art.

The above data shows that the process of the present invention is able to expand the range of properties of an impact modified resin beyond that currently available under the present art.

What is claimed is:

1. A continuous process comprising subjecting at least a portion of a metastable syrup consisting essentially of a continuous or co-continuous rubber phase and a discontinuous or co-continuous resin phase consisting essentially of:
   (i) from 99 to 80 weight % of a resin phase selected from the group consisting of:
      (a) homopolymers of $C_{8-12}$ vinyl aromatic monomers which are unsubstituted or substituted by a $C_{1-4}$ alkyl radical;
      (b) copolymers consisting essentially of:
         (1) from 50 to 90 weight % of one or more $C_{8-12}$ vinyl aromatic monomers which are unsubstituted by a $C_{1-4}$ alkyl radical; and
         (2) from 10 to 50 weight % of one or more monomers selected from the group consisting of $C_{1-8}$ alkyl esters of acrylic or methacrylic acid, acrylonitrile, methacrylonitrile, and maleic anhydride; and
   (ii) from 1 to 20 weight % of a rubber phase selected from the group consisting of:
      (a) co- or homopolymers of $C_{4-6}$ conjugated diolefins;
      (b) random, block, and tapered copolymers comprising from 10 to 80 weight % of one or more $C_{8-12}$ vinyl aromatic monomers which are unsubstituted or substituted by a $C_{1-4}$ alkyl radical; and from 20 to 90 weight % of one or more $C_{6-8}$ conjugated diolefins; and
      (c) copolymers comprising from 5 to 50 weight % of acrylonitrile or methacrylonitrile and from 50 to 95 weight % of one or more $C_{4-6}$ conjugated diolefins;

which has been polymerized to from 5 to 75% conversion to a relatively uniform controlled shear field from 2 to 2,000 $sec^{-1}$ by flowing said portion of said syrup through a device comprising:
   (I) a chamber having a circular cross section perpendicular to its longitudinal axis, at least one input port and at least one output port and a ratio of length to diameter from 0.5:1 to 3:1;
   (II) a cylinder within and occupying substantially the volume of said chamber said cylinder having a circular cross section perpendicular to its longitudinal axis, a surface closely conforming to the internal surface of the chamber except for a closely controlled clearance between the internal surface of the chamber and the external surface of the cylinder defined by the ratio of the radius of the chamber to the radius of the cylinder being from 0.993 to 0.875; and
   (III) means for rotating at least one of said cylinder and said chamber relative to each other,
for a time of less than 10 minutes to cause phase inversion and the formation of a continuous resin phase and a dispersed rubber like composite phase having a volume average diameter from 0.01 to 15 microns.

2. The process according to claim 1, further comprising polymerizing said syrup to crosslink the rubber and fix the particle size of the dispersed rubber like composite phase.

3. The process according to claim 2, further comprising devolatilizing said polymerized syrup.

4. The process according to claim 3, wherein said syrup is polymerized to from 10 to 75% conversion.

5. The process according to claim 4, wherein said syrup consists essentially of from 3 to 12 weight % of rubber and from 97 to 88 weight % of said resin phase.

6. The process according to claim 5, wherein in said resin phase said vinyl aromatic monomer is selected from the group consisting of styrene, alpha methyl styrene, paramethyl styrene, and p-t-butyl styrerie and said $C_{1-8}$ alkyl ester of acrylic or methacrylic acid is selected from the group consisting of methyl methacrylate, ethyl methacrylate, methyl acrylate, ethyl acrylate, butyl acrylate and ethylhexyl acrylate.

7. The process according to claim 6, wherein said at least a portion of said metastable syrup is all of said metastable syrup.

8. The process according to claim 7 Wherein said resin phase is a homopolymer of styrene; said rubber phase is polybutadiene and the particle size of said dispersed rubber-like composite phase is from 0.5 to 15 micrometers.

9. The process according to claim 7 wherein said resin phase is a copolymer consisting essentially of:
   (1) from 50 to 90 weight % of styrene; and
   (2) from 10 to 50 weight % of one or more monomers selected from the group consisting of acrylonitrile and methacrylonitrile;
said rubber is polybutadiene; and the size of the dispersed rubber-like composite phase is from 0.05 to 5 micrometers.

10. The process according to claim 7, wherein said resin phase is a copolymer consisting essentially of:
   (1) from 50 to 90 weight % of styrene; and (2) from 10 to 50 weight % of one or more monomers selected from the group consisting of methyl methacrylate and ethyl acrylate;

said rubber is polybutadiene; and the size of the dispersed rubber-like composite phase is from 0.05 to 5 micrometers.

11. The process according to claim 6, wherein said metastable syrup is divided into two or more portions each of which is subjected to a different controlled shear field.

12. The process according to claim 11 wherein two or more portions of said metastable syrup which have been subjected to different controlled shear fields are recombined prior to further substantial polymerization.

13. The process according to claim 12 wherein said resin phase is a homopolymer of styrene; said rubber phase is polybutadiene and the particle size of said dispersed rubber-like composite phase is from 0.5 to 15 micrometers.

14. The process according to claim 12 wherein said resin phase is a copolymer consisting essentially of:
   (1) from 50 to 90 weight % of styrene; and
   (2) from 10 to 50 weight % of one or more monomers selected from the group consisting of acrylonitrile and methacrylonitrile;

said rubber is polybutadiene; and the size of the dispersed rubber-like composite phase is from 0.05 to 5 micrometers.

15. The process according to claim 12, wherein said resin phase is a copolymer consisting essentially of:
   (1) from 50 to 90 weight % of styrene; and
   (2) from 10 to 50 weight % of one or more monomers selected from the group consisting of methyl methacrylate and ethyl acrylate;

said rubber is polybutadiene; and the size of the dispersed rubber-like composite phase is from 0.05 to 5 micrometers.

16. The process according to claim 11 wherein said resin phase is a homopolymer of styrene; said rubber phase is polybutadiene and the particle size of said dispersed rubber-like composite phase is from 0.5 to 15 micrometers.

17. The process according to claim 11 wherein said resin phase is a copolymer consisting essentially of:
   (1) from 50 to 90 weight % of styrene; and
   (2) from 10 to 50 weight % of one or more monomers selected from the group consisting of acrylonitrile and methacrylonitrile;

said rubber is polybutadiene; and the size of the dispersed rubber-like composite phase is from 0.05 to 5 micrometers.

18. The process according to claim 11, wherein said resin phase is a copolymer consisting essentially of:
   (1) from 50 to 90 weight % of styrene; and
   (2) from 10 to 50 weight % of one or more monomers selected from the group consisting of methyl methacrylate and ethyl acrylate;

said rubber is polybutadiene; and the size of the dispersed rubber-like composite phase is from 0.05 to 5 micrometers.

* * * * *